UNITED STATES PATENT OFFICE.

ERNST TWITCHELL, OF WYOMING, OHIO.

PROCESS OF SEPARATING LIQUID FROM SOLID FATTY ACIDS.

No. 918,612.        Specification of Letters Patent.        Patented April 20, 1909.

Application filed November 11, 1907. Serial No. 401,619.

*To all whom it may concern:*

Be it known that I, ERNST TWITCHELL, a citizen of the United States, residing at Wyoming, in the county of Hamilton and State of Ohio, have invented certain new and useful Improvements in Processes of Separating Liquid from Solid Fatty Acids, of which the following is a specification.

The object of my invention is to produce an industrial chemical process for separating from a common source the fatty acids which are solid at normal temperature, (of which stearic acid is an example), from those other fatty acids which are liquid at normal temperature, (of which group oleic may be cited as a familiar example.)

Tallow and other solid fats of animal or vegetable origin contain glycerin, which is separated out by the well-known saponification process. The remaining tallow is practically an intermixture of stearic and oleic fatty acids, the stearic acid being a solid and the liquid oleic acid being physically contained within the interstices formed by the crystals of the stearic acid, very much as water is held in a sponge. The most familiar process for separating these fatty acids one from the other, is the physical operation of pressing the fatty acid cake within a cloth. This operation is slow and expensive as only small cakes of fatty acid can be conveniently handled.

By my process, large tanks and other apparatus of a type familiar to the industrial organic chemical arts may be employed, so as to reduce to a minimum the mechanical and manual operations and to handle the products in large quantities on a cheap commercial basis.

I have discovered that sulfo-fatty acid is soluble in the liquid fatty acids and is also soluble in water, so that this process depends upon this mutual solubility, by means of which water may be made to separate out the liquid fatty acid from the solid fatty acid. Sulfo-fatty acids are soluble in the liquid fatty acids, but the member of the sulfo-fatty acid group which I prefer to employ as the reagent is the sulfo-fatty-aromatic acid, described in my Patent No. 628,503, dated July 11, 1899, although it is also possible to use simple sulfo-fatty acid or any water-soluble combination thereof. The claims therefore are to be read with the understanding that these reagents are equivalents.

The preferred method of practicing the process is to melt the mixed fatty acids in a suitable vessel or tank, introducing and thoroughly intermixing a relatively small percentage (say one per cent.) of a sulfo-fatty acid, or better, the sodium salt of this acid. The sulfo-fatty acid dissolves in the mixed hot or melted liquid fatty acids, but in cooling the stearic acid crystallizes out of the solution and solidifies, leaving the reagent dissolved in the liquid oleic acid, and the solution contained physically in the solidified cake much as in the original cake, but with the oleic acid now slightly soluble in water by virtue of its having a sulfo-fatty acid in solution. This solidified cake is then preferably comminuted and washed with water. The water being slightly soluble in the oleic acid solution, emulsifies this solution and the emulsion is then washed away with the water. If the original cake is comminuted and washed with water alone the oleic acid does not emulsify and the water does not touch the liquid oil or wash it away in any appreciable degree.

Without attempting an accurately scientific definition of the emulsifying action, a general mental conception may be formed of this process; the slight solubility of the wash water in the oleic and sulfo-fatty acid solution produces such a slight but sufficient degree of the action of solution as to enable the water, as it were, to mechanically penetrate into the oleic acid and sulfo-fatty acid solution, so that so much of this solution as is not dissolved in the water is physically broken up into minute globules forming a milky or turbid mixture, which is known as an emulsion, and which emulsion is mechanically carried off by the washing operation. When the wash water is allowed to stand the oil or oleic acid containing the sulfo-fatty acid in solution will rise to the surface and may be readily decanted by any means familiarly employed for this purpose. The amount of oleic acid remaining in solution in the water after the decantation is so slight as to be of no material consequence, although it may be removed if desired, by a subsequent process which I need not here describe.

Another way of effecting this process is to first dissolve the sulfo-fatty acid, or its sodium salt, in the water and then to wash the cake, or a comminuted mass thereof, with the water charged with the reagent. Here again the oleic acid is slightly soluble in the water solution of the sulfo-fatty acid and the emulsifying and washing process are the same as previously described. With this method I prefer to mix the water containing the sulfo-fatty acid, say with one per cent. of sulfuric acid, or with common salt, which does not affect its solubility in oleic acid, but renders it less soluble in water, without in any wise effecting the emulsifying and washing process depending upon the slight solubility of oleic and sulfo-fatty acid in water.

It does not matter very materially whether the sulfo-fatty acid is first dissolved in the liquid fatty acid or in the water.

This process is very simple and complete, and can be economically carried on in connection with the various chemical industrial arts engaged in handling this class of products.

The present mechanical separation is an intermittent operation carried on through the agency of small presses.

My new method may not only be continuous, but may be practiced on a large industrial scale with superior results in both products and process.

Having described my invention, I claim:—

1. The herein described process of separating intermixed solid and liquid fatty acids from one another, which consists in dissolving in the liquid fatty acid a relatively small per cent. of a sulfo-fatty acid, washing out with water the liquid fatty acid from the solid and decanting the liquid oil from the wash water, substantially as described.

2. The herein described process of separating the liquid from the solid fatty acids, which consists in emulsifying and washing the liquid fatty acids from a mixture thereof with the solid fatty acids, substantially as described.

3. The herein described process of separating the liquid from the solid fatty acids, which consists in emulsifying and washing the liquid fatty acids from the mixed comminuted source, substantially as described.

4. The herein described process of separating the liquid from the solid fatty acids, which consists in subjecting them to the joint action of water and sulfo-fatty acid, substantially as described.

In testimony whereof, I have hereunto set my hand.

ERNST TWITCHELL.

Witnesses:
OLIVER B. KAISER,
LEO O'DONNELL.